F. W. ADSIT.
ELECTROMAGNETIC POWER CONTROL.
APPLICATION FILED DEC. 4, 1916.

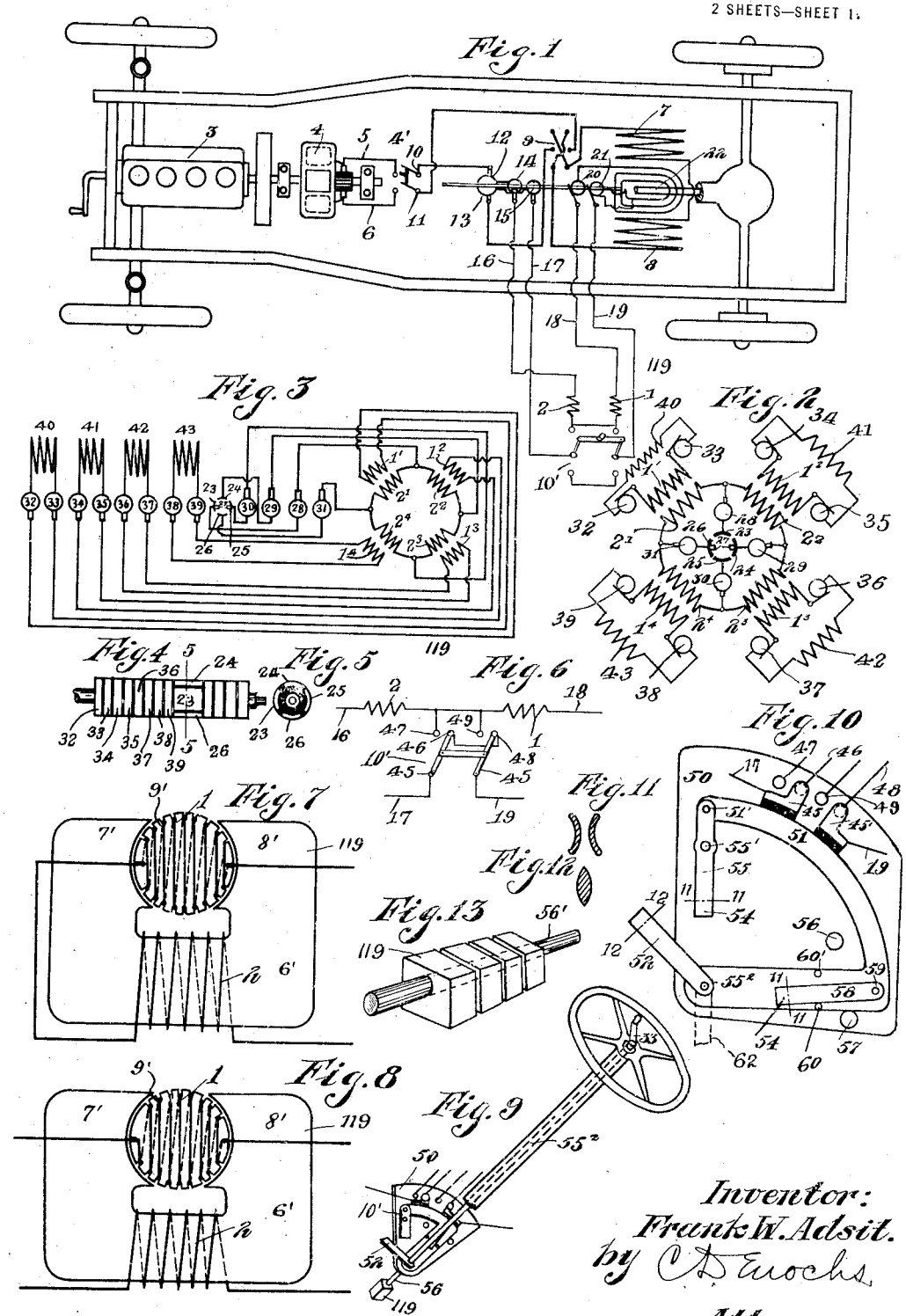
F. W. ADSIT.
ELECTROMAGNETIC POWER CONTROL.
APPLICATION FILED DEC. 4, 1916.
1,361,216.
Patented Dec. 7, 1920.
2 SHEETS—SHEET 1.
Inventor:
Frank W. Adsit.
by C. D. Enochs
Attorney.

1,361,216.

Patented Dec. 7, 1920.
2 SHEETS—SHEET 2.

Inventor:
Frank W. Adsit
by C. S. Enoch
Attorney.

UNITED STATES PATENT OFFICE.

FRANK W. ADSIT, OF ST. PAUL, MINNESOTA, ASSIGNOR TO C. D. ENOCHS, OF MINNEAPOLIS, MINNESOTA.

ELECTROMAGNETIC POWER CONTROL.

1,361,216.  Specification of Letters Patent.  Patented Dec. 7, 1920.

Application filed December 4, 1916. Serial No. 135,269.

*To all whom it may concern:*

Be it known that I, FRANK W. ADSIT, a citizen of the United States, and a resident of St. Paul, in the county of Ramsey and State of Minnesota, have invented certain new and useful Improvements in Electromagnetic Power Control, of which the following is a specification.

One object of my invention is to provide means for controlling the amount of power delivered to an electric motor.

Another object of my invention is to provide means that may be associated with the armature of a direct current motor and give control to the amount of current received by the armature, or may be associated with alternating current producing means, and thereby control the current delivered by said alternating current producing means.

Another object of my invention is to provide an improved type of variable transformer and circuit changing means whereby it may be used as a variable impedance.

Another object of my invention is to provide a circuit for changing my variable transformer to a variable impedance, or vice versa.

Another object of my invention is to provide for a self-propelling vehicle, means for producing electrical current from a prime mover, and applying the current so produced through my variable control means to a motor driving the propeller shaft of the vehicle.

Another object of my invention is to provide in a generator, producing alternating current that is commutated into direct current for field excitation, means for regulating the impedance of the armature circuit of the generator, so that the current flow can be regulated without a resistance loss in the circuit.

Another object of my invention is to provide in a convertible adjustable impedance coil or transformer, means whereby the impedance may be varied from a certain maximum amount to a certain minimum amount.

Another object of my invention is to provide means, whereby the voltage of the secondary of my convertible adjustable impedance coil and transformer may be varied from zero to the full voltage obtainable with the ratio of the number of turns used in the primary and secondary winding.

Another object of my invention is to provide in a self-propelling vehicle, a prime mover, generator, motor and controlling means between said generator and said motor, whereby the motor may be started with the current controlled by an adjustable impedance coil, the adjustable impedance coil converted into an adjustable transformer, and means for making the conversion of the impedance coil to a transformer at such a point that the current flow at the moment of the conversion will not be substantially changed by the conversion from the impedance coil to the transformer.

Another object of my invention is to provide means for producing the conversion at a different point in the operation of the mechanism when it is being operated in one direction than when it is being operated in the other direction.

With these and incidental objects in view the invention consists of certain novel features of construction and combination of parts, the essential elements of which are hereinafter described with reference to the drawing which accompanies and forms a part of this specification:

In the drawing, Figure 1 is a conventional plan view of an automobile to which my invention is applied.

Fig. 2 is a conventional wiring diagram of the motor armature and the variable impedance and transformer.

Fig. 3 is a development of the conventional circuits shown in Fig. 2. Fig. 4 is a conventional representation of the collector rings needed in the circuit, shown in Fig. 3, and Fig. 5 is a section taken on the line 5—5, Fig. 4.

Fig. 6 is a conventional diagram of the circuit used in converting the coils from a variable impedance coil to a variable transformer.

Fig. 7 is a conventional view of the coils connected as a variable impedance coil. Fig. 8 is a conventional view of the coils connected as a transformer.

Fig. 9 is an isometric view of a steering post and the controlling switch and quadrant to show the relative coöperation therebetween.

Fig. 10 is an enlarged view of the quadrant shown in Fig. 9. Fig. 11 is a section taken on either of the lines 11—11, Fig. 10, and Fig. 12 is a section taken on the line 12—12, Fig. 10.

Fig. 13 is an isometric view of a number of convertible variable impedance coils and transformers associated together with the rotatable coils mounted on a common shaft, so that all of the coils may be rotated together.

Figure 14:
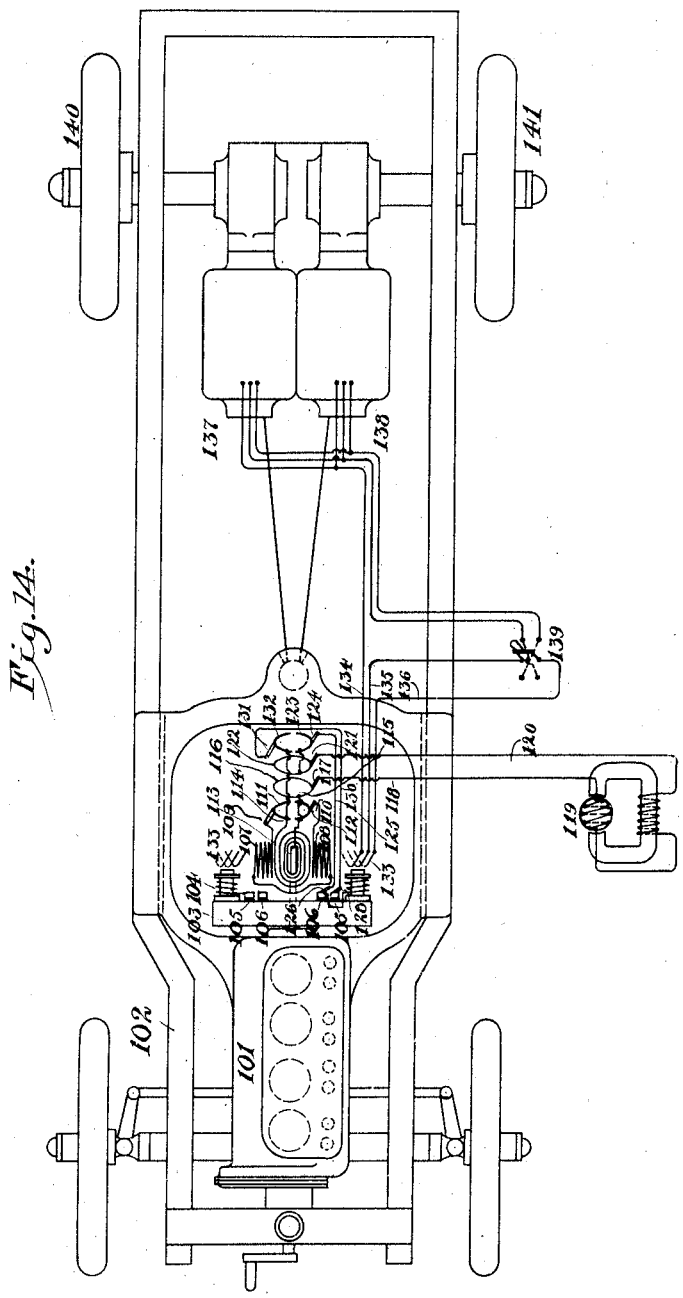
Fig. 14 is a conventional plan view of an automobile in which alternating current electrical power machinery is controlled by my improved electro-magnetic power control.

This invention contemplates the use of certain devices and circuits for controlling electrical power, either by its application in a motor circuit, or its application in a generator circuit, and as will be readily understood by those skilled in the art from the specification and drawings is equally applicable to direct or alternating current machines.

I have shown it in the drawings as applied to an automobile, as this is one large field for its application, but it is to be understood that it may be equally well applied to stationary motors, generators or dynamos, and has a very wide field of application to electrical railway work, especially that using single phase or polyphase alternating current.

While I am aware that certain electro-magnetic transmissions have been designed, and numerous control systems are in use at the present time, I believe myself to be the first to devise means for cutting down the flow of direct current by commutating the same to form an alternating current and then introducing impedance coils into the alternating current circuit.

As shown in the drawings, Figs. 1, 6, 7, and 8, I employ a unit 119 comprised of a yoke 6', of iron or other suitable material, on which is wound a coil 2. The yoke is formed into pole pieces 7' and 8', and a rotatable element 9' carrying a winding which is positioned between the pole pieces.

It is evident that with the circuit connections as shown in Fig. 7 the impedance of the unit may be varied by turning the coil 1 so that the impedance will reach a maximum when the rotatable member is positioned as shown in Fig. 7, and will diminish to a minimum if the rotatable member is turned 180°.

It will also be evident that if the unit is used as a transformer, the connections being as shown in Fig. 8, current introduced through coil 2 will be transformed into coil 1, and the voltage induced therein will vary from a maximum amount when the coil is in the position shown in the drawing to a zero voltage when the coil is rotated 90° and to a maximum amount in the opposite direction when the coil is rotated 180° from the position shown in Fig. 8.

In Fig. 1, a prime mover, such as a gasolene engine 3, drives in any suitable manner, a generator 4, from which current is taken by wires 5 and 6 to the field coils 7 and 8 of a series wound motor through a reversing switch 9.

From points 10 and 11, which are connected through a switch 4' to the generator terminals, current is applied to a pair of commutator segments 12 and 13, which are connected, respectively, to rings 14 and 15, from which current is taken by wires 16 and 17 to coil 2 of the variable transformer.

From coil 1 of the variable transformer, the current is taken by wires 18 and 19 to rings 20 and 21 connected to the armature coil 22 of the motor. The commutator 12, 13 and slip rings 14 and 15, as well as the slip rings 18 and 19, are mounted on the armature shaft of the motor.

It is evident that with a simple machine of this type, direct current from the wires 5 and 6 will be reversed at each revolution of the motor commutator, hence that alternating current will be delivered by the coil 1 of the transformer to the armature, and that the voltage and current delivered by this coil to the armature can be varied by rotating the coil 1 to 90 degrees from a maximum to zero, or if desired, the motor can be reversed by turning the coil 1 past its zero position, and a maximum voltage in the reverse direction may be supplied to the armature.

I prefer, however, to only rotate the coil as a transformer through 90 degrees, and reverse the direction of the motor by the reversing switch 9, which merely reverses the current through the fields of the motor.

I show in Fig. 1, the application of my invention to a simple one-coil armature machine.

In Fig. 2 I show its application to a four-coil armature machine, in which segments 23, 24, 25 and 26 receive direct current from the brushes 27 and are connected by rings 28, 29, 30 and 31 to transformer coils 2', $2^2$, $2^3$ and $2^4$.

The secondary transformer coils 1', $1^2$, $1^3$ and $1^4$ are connected by rings 32, 33, 34, 35, 36, 37, 38 and 39 to armature coils 40, 41, 42 and 43.

The same circuit arrangement is shown in Fig. 3, in development, and it is evident that a direct current motor armature of this character would receive alternating current from the coils 1, and that the voltage delivered by these coils could be varied as heretofore explained.

In applying my invention to an automobile or other device, I prefer to mount the units 119 one above the other with the rotatable coils all carried on a single shaft 56'.

In utilizing my invention with an automobile, let us first consider a car as standing still, with the engine running, and hence generating current in the generator 4, but with the main switch 4' opened.

If the automobile is on a steep hill, or in a heavy, sandy or muddy road, it is evident that a considerable amount of torque will be required to start the car.

When the main switch 4' is closed with the coils 1 and 2 connected in series for maximum impedance the first impulse of current passing through the coils will be choked by the impedance of the coils and while the current would build up to a heavy starting torque, if the commutator remains stationary, the power of the device is such that the automobile will be started and as soon as the commutator begins to revolve the current passing through the coils 1 and 2 will be continuously choked a certain degree by the impedance of the coils.

This circuit arrangement is best shown conventionally in Fig. 6, in which coils 1 and 2 are shown connected at one end by wire 44. One switch blade 45 of the two pole double throw switch 10' is adapted to make contact, either with the post 46 or 47, while the other blade will at the same time make contact with the post 48, or the post 49.

The switch is shown conventionally in the starting position, in which current from the wires 16 and 17 would flow through coils 2 and 1 to wires 18 and 19, thus feeding current to the motor through the armature of the adjustable unit as an impedance coil, and this impedance coil would be so positioned as to give the maximum amount of impedance.

If the car did not start when this current was thrown into the motor armature, the impedance would be gradually reduced to a minimum amount, and this minimum amount would be such that the car would start under all conditions for which it was designed.

When the car got under way, the amount of impedance would be increased, so as to cut down the armature current, and the switch 10' would, during the rotation of the coils 1, be thrown to the position connecting points 47 and 49 to the circuit, and cutting out points 46 and 48.

It is evident that in this latter circuit condition, coils 1 and 2 will act purely as transformers, and the armature current will be delivered by the transformer.

As the car is now running, its speed may be varied at will by rotating the coils 1, so as to vary the amount of voltage delivered by the secondary of the transformers.

In applying this controller to the steering post of an automobile, I employ a frame 50, Figs. 9 and 10, on which is rotatably mounted a quadrant 51 carrying the switch blades 45 and 45', and the quadrant is frictionally mounted, so that it will remain in the position in which it is set, unless considerable pressure is exerted to rotate it.

The switch blades 45 and 45' are adapted to coöperate with contacts 47, 46, 49, and 48, as indicated diagrammatically in Fig. 6, said contacts being mounted on the frame 50.

The frame 50 is conveniently placed on the steering post being shown at the base thereof, and is perforated to form a bearing for a shaft $55^2$, which extends up through the steering post and terminates in a hand lever 53'.

The shaft $55^2$ is connected directly with the shaft 56', Fig. 13, so that the rotatable coils will turn through the same angle as does the lever 52 which is keyed or otherwise secured to the shaft $55^2$ which controls the position of the rotatable coils, the shaft $55^2$ being controlled by the hand lever 53.

The shaft $55^2$ is designed to turn through 360° or more but the quadrant 51 has only a slight movement limited by the stops 56, 57, mounted on the frame 50 so as to shift the switches 45, 45' from contacts 46, 48 to contacts 47, 49, and vice versa. The quadrant 51 is loosely mounted on the shaft $55^2$ and is actuated by means of a lever 52 rigidly mounted on said shaft and frictionally engaging between lips 54 on the ends of levers 55, and 58, which are in turn pivoted to the ends of the quadrant at 51' and 59, respectively. The lever 55 is pivoted at 55' intermediate its ends, to the frame 50 while the lever 58 is carried wholly by the quadrant 51, its movement being limited by stops 60, 60' on said quadrant, for a purpose to be explained later.

When the lever 52 is at the position 62, the rotatable coils will be acting as impedance coils having the maximum impedance, and if the lever 52 is rotated from this point in a clockwise direction through 180 degrees, the coils will be acting still as impedance coils interposing a minimum amount of impedance.

The coaction of the lever 52 and the lever 55 through the frictional engagement of its lips 54 at this point shifts the quadrant 51 and switch contacts 45, 45', and changes the impedance coils to transformers, and the transformers are so positioned to give maximum voltage in the secondary.

If the lever 52 is rotated through 90 degrees more in a clockwise direction, the voltage from the transformer reaches zero, and the motor will of course become inoperative.

Beyond this point, the passing of the lever 52 between the lips of the lever 58 will switch the coils from transformers to impedance coils, with an impedance slightly less than half of their maximum.

With the lever turning from the position shown dotted at 62 in an anti-clockwise direction, the impedance of the coils will be reduced until the lever 52 passes lever 58, which will convert the coils to transformers, and at such an angular position of the shaft 56' that the current supplied to the armature by the coils as transformers will be substantially equal to that supplied to the armature through the coils as impedances just before the conversion is made.

If the lever 52 is rotated still farther, it will pass through the lips 54 of the lever 58 hinged at 59 to the quadrant 51 and restore the switch to the position shown in Fig. 10.

During this movement of the lever 52 in an anti-clockwise direction, when it passes through lips 54 of the lever 58, the latter will move between stop pins 60 and 60', without affecting the quadrant 51, but when it has reached the top pin 60', then the quadrant 51 will be shifted, and the connections made as heretofore described.

It is evident, therefore, that while a rotation of the lever 52 in a clockwise direction will always move the quadrant 51 first in an anti-clockwise direction, and then in a clockwise direction, and upon the turning of lever 52 back through 180 degrees to its original position, the quadrant 51 will first be moved in an anti-clockwise direction, and then in a clockwise direction, and the movement of the quadrant 51 by the passing of the lever 52 through the lips 54 of the lever 58 will take place at a different point in the travel of the lever 52, depending upon the direction or rotation of the lever 52.

This is important for this reason: When the car is started with the impedance coil, it may be run indefinitely on the impedance coil, and only the control of the impedance coil used.

If, however, it is switched to a transformer control, this switching should take place at such a point in the position of the coils 1, that the current received by the armature of the motor will not be substantially varied by changing from an impedance coil to a transformer.

If, however, the switching is made, and it is desired to run the car slower after the switching, the lever 52 can be moved back in a clockwise direction beyond the point where the conversion was made while moving in an anti-clockwise direction, and the car run on the transformer control down to the zero position of the transformer control without switching into the impedance control.

Although the application of my invention to other types of power machines should be evident to those skilled in the art, I will now describe its application as shown in Fig. 14, in which 101 is a gasolene engine of any suitable design, and mounted in any suitable manner on the frame 102.

Carried by a fly wheel 103 is a revolving field magnet 104, of an alternating current generator for supplying current to the driving motors 137 and 138, said field magnet having collector rings 105 and 106, by which exciting current may be introduced to the rotating field magnet.

Carried by the frame, exciting coils 107 and 108 of an exciter for energizing the revolving field magnet 104 of the main generator are connected by brushes 109 and 110 to the commutator segments 111 and 112, and the revolving exciter armature 113 is connected at 114 to the commutator segment 111, and at 115 to the commutator segment 112 and also to the collector ring 116, from there through the brush 117 by wire 118 to the variable impedance 119, similar to the one described above from the variable impedance coil 119 through wire 120, ring 122 to segment 123 of a commutator 123, 132, from there through brush 124 and wire 125 to brush 126, collector ring 106 through the winding of the revolving field to the collector ring 105, brush 128, riding on the collector ring 105 through wire 130, and brush 131 to the commutator segment 132 to the other side of the revolving exciter armature winding 113.

It is evident, therefore, that current generated in the armature 113 by its revolving in the field 107 and 108 is alternating current, which will be led through the variable impedance 119, and then after it has passed through this impedance be commutated into direct current and supplied to the field 104.

The stationary power armature 133 of the main generator is shown conventionally as having a three phase winding, and the three phase alternating current is led by wires 134, 135 and 136 to the motors 137 and 138 and wires 135 and 136, pass through the reversing switch 139 to allow the reversing of the motors 137 and 138.

The motors 137 and 138 drive by bevel gears, or in any suitable manner, the axles carrying the drive wheels 140 and 141, the two axles being independent of each other.

It is evident that with this application of power by two separate motors, either of the wheels 140 or 141, may turn faster than the other, and it is impossible for one wheel to lose its power because the other wheel slips or spins.

It is also evident that the power delivered to the motors 137 and 138 by the generator will vary with the impedance of the coil 119, as the variation of this impedance coil will vary the amount of exciting current delivered to the generator revolving field.

While I have described my invention and illustrated in several particular designs, I do not wish it understood that I limit myself to these constructions, as the application of my invention may be varied in many ways within the scope of the following claims.

Claims:

1. In an electromagnetic machine having an armature coil and a commutator the combination with said armature coil and with said commutator of a convertible variable transformer and impedance coil.

2. In an electromagnetic machine having an armature coil and a commutator the combination therewith in a series circuit of one winding of a convertible transformer and impedance coil, the other winding thereof being connectible to an independent source of electrical energy.

3. In an electromagnetic machine having an armature winding and a commutator the combination with said winding and said commutator of a convertible transformer and impedance coil, and means for converting said coil from an impedance coil to a transformer.

4. In a self-propelling vehicle the combination of means for generating electric current, an electrical current responsive means having an armature carrying an armature winding, a transformer in circuit with said winding and having a pair of coils convertible from a transformer to an impedance coil, means for varying the impedance of said coils, and means for converting said coils from impedance coils to a transformer.

5. The combination with an adjustable convertible transformer and impedance coil of means for converting said coil from a transformer to an impedance coil at a point where the impedance is slightly less than half of the maximum, and means for converting said coil from an impedance coil to a transformer at a point where the secondary will receive a maximum voltage from the primary.

FRANK W. ADSIT.